(12) United States Patent
Morishima et al.

(10) Patent No.: US 8,606,425 B2
(45) Date of Patent: Dec. 10, 2013

(54) ADJUSTABLE UPS PROTECTION

(75) Inventors: Yoichi Morishima, Tokyo (JP); David M. Westmoreland, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 648 days.

(21) Appl. No.: 12/768,306

(22) Filed: Apr. 27, 2010

(65) Prior Publication Data
US 2011/0264292 A1   Oct. 27, 2011

(51) Int. Cl.
*G06F 19/00* (2011.01)

(52) U.S. Cl.
USPC ............. 700/298; 307/66; 363/37; 363/40; 363/96

(58) Field of Classification Search
USPC .............. 700/297, 298; 363/37, 40, 96, 142; 307/43, 66; 323/258; 320/163
See application file for complete search history.

(56) References Cited

U.S. PATENT DOCUMENTS

| | | | |
|---|---|---|---|
| 4,400,624 A | | 8/1983 | Ebert, Jr. |
| 4,475,047 A | * | 10/1984 | Ebert, Jr. ................. 307/66 |
| 4,782,241 A | * | 11/1988 | Baker et al. ............. 307/66 |
| 4,916,329 A | * | 4/1990 | Dang et al. .............. 307/66 |
| 5,483,463 A | | 1/1996 | Qin et al. |
| 5,602,462 A | | 2/1997 | Stich et al. |
| 5,631,814 A | * | 5/1997 | Zak ........................ 363/37 |
| 5,896,282 A | * | 4/1999 | Wu ......................... 363/96 |
| 5,982,645 A | * | 11/1999 | Levran et al. ........... 363/37 |
| 6,226,191 B1 | * | 5/2001 | Severinsky et al. ..... 363/40 |
| 6,330,176 B1 | | 12/2001 | Thrap et al. |

OTHER PUBLICATIONS

International Search Report of PCT/US2011/034136, date of mailing Aug. 25, 2011.

* cited by examiner

*Primary Examiner* — Kavita Padmanabhan
*Assistant Examiner* — Douglas Lee
(74) *Attorney, Agent, or Firm* — Westerman, Hattori, Daniels & Adrian, LLP

(57) ABSTRACT

An uninterruptable power supply (UPS) designed to switch power inputs between an alternating current mode and a battery mode by adjusting the amplitude and/or frequency windows of the input voltage so that the uninterruptible power supply accepts the unstable voltage and/or frequency. This prevents the uninterruptible power supply to switch back to the battery mode during a transfer time between the battery mode and the AC mode. The uninterruptable power supply includes a control circuit. The control circuit modifies the monitored value and/or actual amplitude and/or the frequency window when unstable amplitude and/or an unstable frequency are detected at the input terminal of the input voltage.

20 Claims, 9 Drawing Sheets

ADJUSTABLE UPS PROTECTION

ADJUSTABLE UPS PROTECTION

FLOW CHART HOW TO SET THE FREQUENCY DEFECTION LEVEL

ADJUSTABLE UPS PROTECTION

BACKGROUND

1. Field

This invention relates to an uninterruptible power supply, and more particularly to an uninterruptible power supply that adjusts the monitored/perceived value of the amplitude and/or frequency of the input voltage so that the uninterruptible power supply accepts the unstable voltage and/or frequency, thereby preventing the uninterruptible power supply to switch back to the battery mode during a transfer time between the battery mode and the AC mode.

2. Description of Related Art

The following description sets forth the inventors' knowledge of related art and problems therein and should not be construed as an admission of knowledge in the prior art.

Figure 1:
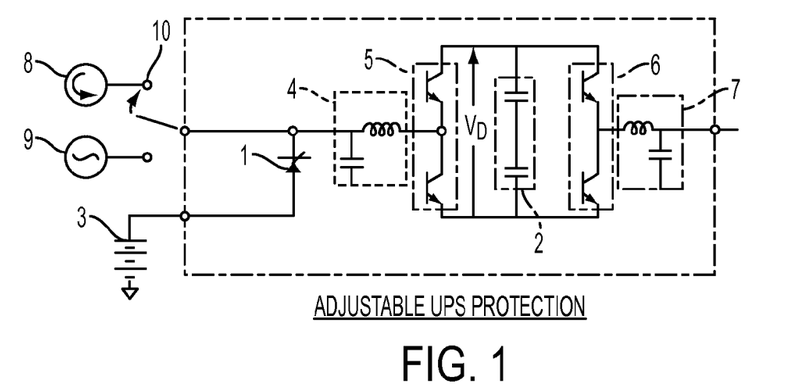
FIG. 1 is a circuit diagram of a related uninterruptable power supply.

As illustrated in FIG. 1, an uninterruptible power supply (UPS) has a generator 8 that is provided as an alternate source of AC power supply in an event of a power failure. The switching between commercial power 9 and a generator 8 is performed by a switch 10. The UPS system also constitutes a battery thyristor 1, a main capacitor module 2, a battery module 3, an input filter circuit 4, an input converter module 5, an output inverter module 6 and an output filter module 7.

Figure 2A:
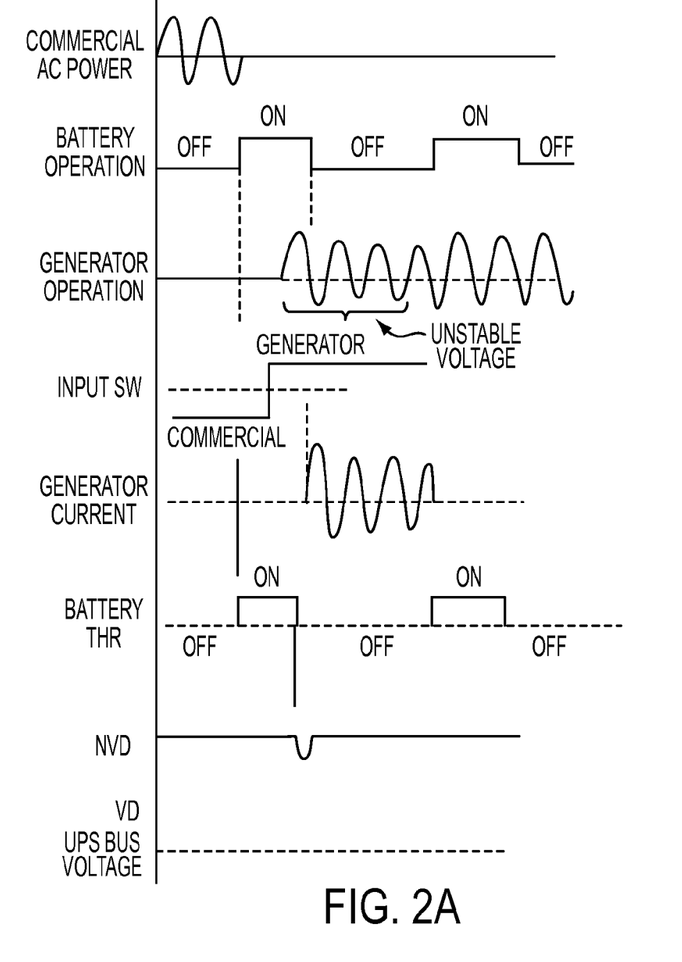

As shown in FIG. 2(A), during switching time from commercial power 9 to generator power 8, the UPS supplies power to the load using the battery module 3. Normally, during this switching time, the voltage across the main capacitor module 2 is boosted up by a battery package using a voltage boost up circuit.

Figure 2B:
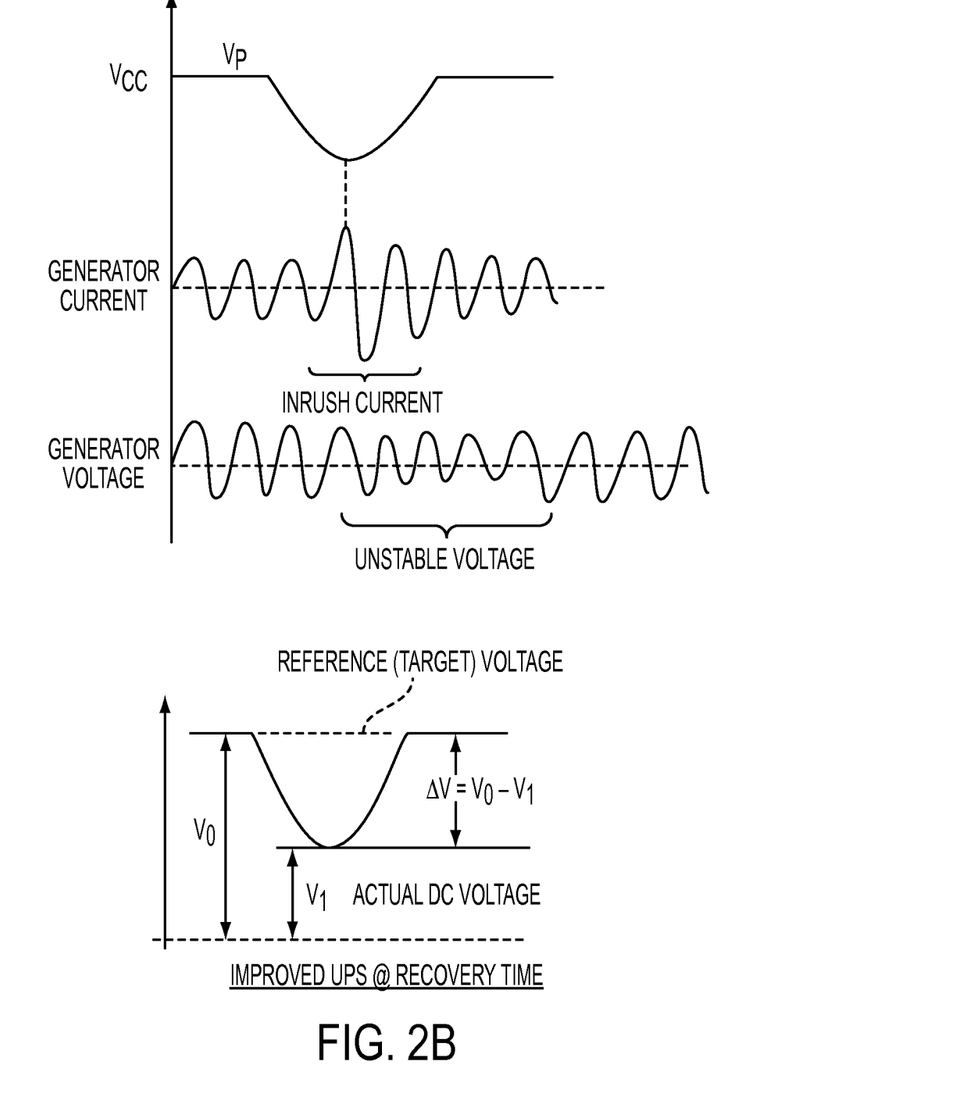

However, as illustrated in FIGS. 2(A) and (B), when the UPS is switched from the battery backup mode to the generator mode, the battery thyristor (THY) 1 turns off and the mode is transferred to AC input mode. During this transfer, which may take 3 to 10 cycles, the DC voltage across the main capacitor module 2 drops because of the energy consumed in capacitors as shown by the exponential decay in the graph of FIGS. 2(A) and (B) (NVD=Target Voltage Drop across the main capacitor module 2).

The calculation for DC voltage drop across the equivalent circuit of the main capacitor module 2 in view of FIGS. 2(A) and 2(B) is as follows:

For example: UPS output 10 KVA

Output Power Factor (p.f.)=0.85

DC/AC efficiency=85%

Period (3 cycles)=50 ms between Battery and AC mode $$\text{Energy consumption}(J) = \text{UPS output}(KVA) * \text{output } p.f. * 1/DC\text{-}AC \text{ Efficiency} * \text{period} \quad (1)$$

$$\text{Energy consumption}(J) = 10*10^3*0.85*1/0.85*50\times 10^{-3}$$

Energy consumption (Ec)=500 Joules $$\text{The Energy storage at main capacitor} = \tfrac{1}{2} * C * V^2 \quad (2)$$

For equivalent capacitance in main capacitor module 2=8400 µF

C=8400 micro farads, and

Vo=770 Volts $$\tfrac{1}{2}*C(Vo^2 - V1^2) = Ec \quad (3)$$

Therefore, $$V1 = \sqrt{Vo^2 - \frac{2Ec}{C}} \quad (4)$$

$$= \sqrt{770^2 - \frac{2\times 500}{8400\times 10^{-6}}} = 688 \text{ V}$$

Therefore, ΔV=Vo−V1=770−688=82 Volts drop

Therefore, when the generator input voltage is applied to the UPS, a large inrush current flows due to the voltage difference between the capacitor bank's actual voltage and target voltage, which causes the voltage from the generator to drift causing unstable condition in generator operation as shown by the graph in FIGS. 2(A) and (B).

In other words, during switching power from battery module 3 to the generator 8, a high current flows through the UPS due to the voltage drop in the DC bus. Especially, in a case of generator connection to AC line, this current may become large due to oscillations caused by the generator's internal impedance (mostly inductive) and the impedance of input filtering capacitor. As a result of the large oscillatory current, the output voltage of the generator becomes unstable. When the UPS detects this unstable voltage and/or frequency, it moves the UPS to Battery backup mode again. In the case where inrush current is too large, the problem of repeated switching between the generator mode and the battery backup mode occurs thereby causing battery to burn up additional power.

SUMMARY

In some exemplary embodiments, the aforesaid problem of the related uninterruptable power supply may be solved by configuring the UPS to switch power inputs between an alternating current (AC) mode and a battery mode by including a control circuit to monitor amplitude and a frequency of an input voltage at an input terminal or terminals of the UPS. The control circuit modifies the monitored value and/or actual amplitude and/or the frequency window when unstable amplitude and/or an unstable frequency are detected at the input terminal of the input voltage. The unstable amplitude at the input terminal of the input voltage is modified by adjusting a voltage window for a predetermined number of cycles during a transfer time between the battery mode and the AC mode. The unstable frequency at the input terminal of the input voltage is adjusted by adjusting a frequency window for a predetermined number of cycles during a transfer time between the battery mode and the AC mode. The voltage window has input voltage protection values that are greater than operating voltage range values of the UPS. The input voltage protection values are selected by the control circuit having a control processor unit (CPU) based on an output current of the UPS. The frequency window has a range that is wider than the operating frequency range of the UPS.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and other features and advantages of embodiments of the present invention will become more apparent by describing in detail exemplary embodiments thereof with reference to the attached drawings in which:

FIG. 2 (A) is a timing diagram of currents, voltages and switches according to the uninterruptable power supply of FIG. 1;

FIG. 2 (B) is a more detailed timing diagram of currents and voltages according to the uninterruptable power supply of FIG. 1;

DETAILED DESCRIPTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 8A:
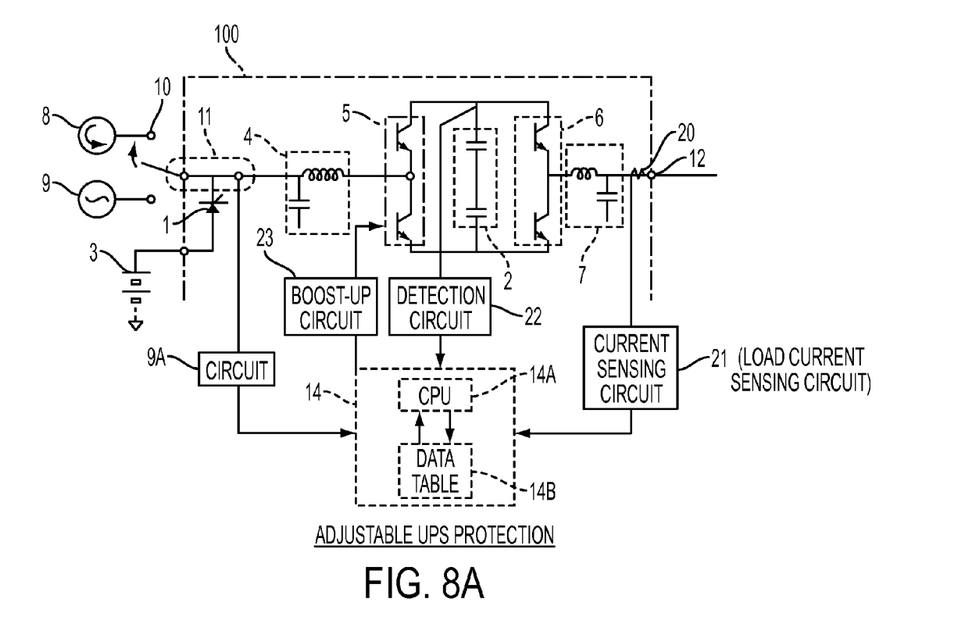
FIG. 8(A) is a circuit schematic of an uninterruptible power supply system according to an embodiment of the present application.

FIG. 8A illustrates an exemplary embodiment of the uninterruptable power supply 100 comprising a battery thyristor 1, a main capacitor module 2, a battery module 3, an input filter circuit 4, an input converter module 5, an output inverter module 6, an output filter module 7, an AC generator 8, commercial AC power 9, a current transducer 20, a load current sensing circuit 21, a DC Bus voltage detection circuit 22, a DC Bus voltage boost-up control circuit 23, an input voltage/frequency detection device 9A and a control circuit 14.

As illustrated in FIG. 8A, the UPS 100 has a switch 10 connected to an input 11 of the UPS. The switch 10 is operated to receive an input power from an alternating current source, such as commercial AC power from the power grid, or AC power from a generator or a DC power source such as a battery. The switch 10 can be either a mechanical switch or a solid state switch. The main switch 10 and the battery module 3 are connected to the input of an input filter circuit 4. A thyristor 1 is connected between the output of the battery module 3 and the input 11. The input filter 4 receives the AC power from the power grid or the generator or the DC power from the battery and sends it to the DC bus of the UPS. The DC bus comprises the input converter module 5, the main capacitor module 2 and output inverter module 6. The main capacitor module 2 is used for storing the energy for holding up the DC bus voltage. The output inverter module 6 is connected to the input of the output filter module 7. A current transducer 20 is connected to the output end of the output filter module 7. A load current sensing circuit 21 is connected to the current transducer 20 for detecting load current and providing the detected load current at the output 12 of the UPS to the control circuit 14. The control circuit 14 is also connected to receive input voltage and/or frequency from the input voltage/frequency detection device 9A connected to the input 11 of the UPS and the DC Bus voltage across the main capacitor module 2 from the DC Bus voltage detection circuit 22 connected to the DC Bus. The DC bus voltage Boost-up control circuit 23 communicates with the control circuit 14 to provide the adjustment value to the input voltage at the DC Bus.

Figure 8B:
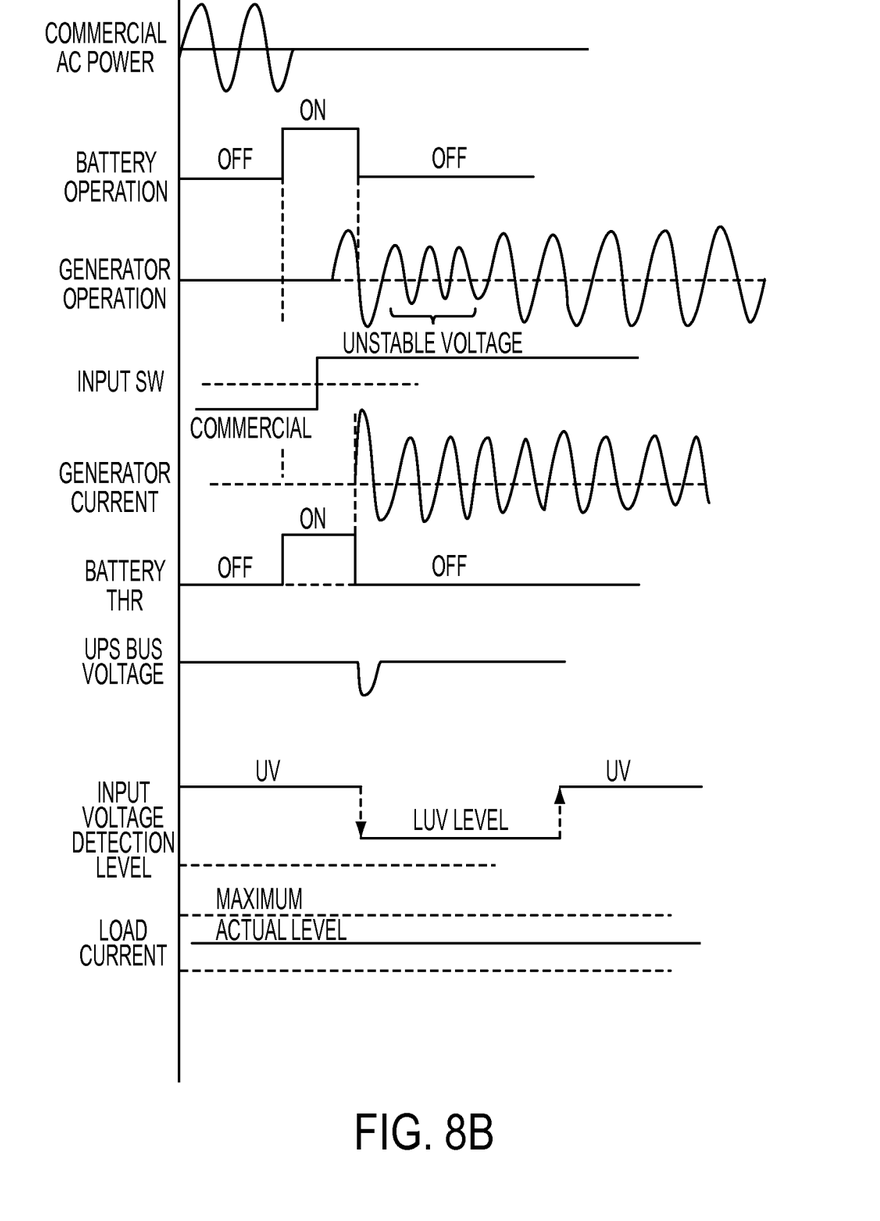
FIG. 8(B) is a timing diagram of currents, voltages and switches according to the uninterruptable power supply of FIG. 8(A).

FIG. 8(B) shows the timing sequence of the exemplary embodiment in FIG. 8(A). As illustrated in FIG. 8(B), when the UPS 100 is connected to the generator 8 that may result in load current (the current at the output terminal 12, FIG. 8(A)) to fall below the maximum current, the input current can be increased even if the input voltage is less than minimum voltage. This is because input current (generator current) is inversely proportional to the input voltage as give by the following relationship where:

Input current=K*output current/input voltage where K=constant

Because of the power consumption in the DC bus circuit, this relationship can be derived as follows:

Input power=output power/efficiency (decided by the unit)     (1)

Output power=output voltage(constant such as 120V)*output current*output power factor(constant such as 0.8)     (2)

Input power=input current*input voltage*power factor (to simplify assume *p.f.* as 1.0)     (3)

So, from formula (1) to (3) above, the above relationship can be derived in terms of:

Input current=$K$*output current/input voltage ($K$=constant)     (4)

That is, if the output current at the load is less than maximum, the voltage at the input 11 can be lowered to maintain a maximum input current level because of the inverse relationship between the input current level and input voltage as in (4) above. The control circuit 14 based on the input from input voltage/frequency detection device 9A, that monitors the amplitude and frequency of the input voltage at the input 11 of the UPS, the input from load current sensing circuit 21, that monitors load current at the output 12, and the input from the DC Bus voltage detection circuit 22, that monitors the voltage across the main capacitor module 2, adjusts the DC bus voltage of the UPS by way of the DC Bus voltage boost-up control circuit 23.

Figure 3:
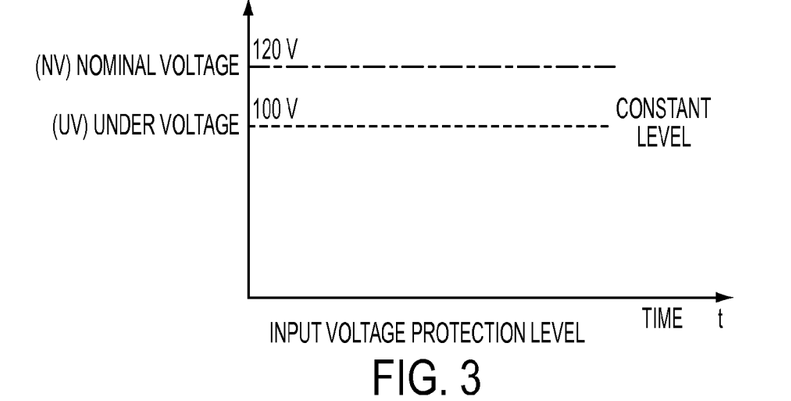
FIG. 3 is a graph showing a relationship between nominal voltage and under voltage at constant level with respect to time.

In this exemplary embodiment, the UPS can adjust the input voltage window based on the load current (current at output 12) as low as the lowest under voltage (LUV) without stopping the operation of the UPS. FIG. 3 shows a relationship between nominal voltage and under voltage at constant level with respect to time.

Figure 4:
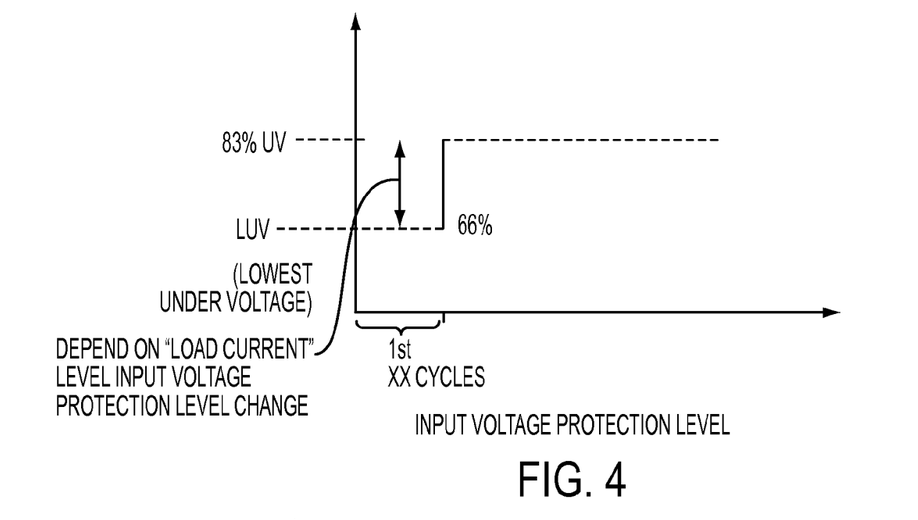
FIG. 4 is a graph showing a range for an input voltage protection level on vertical axis, which depends on load current level between lowest under voltage (LUV) and under voltage (UV), with respect to time on horizontal axis for first 10 cycles for example.
Figure 5:
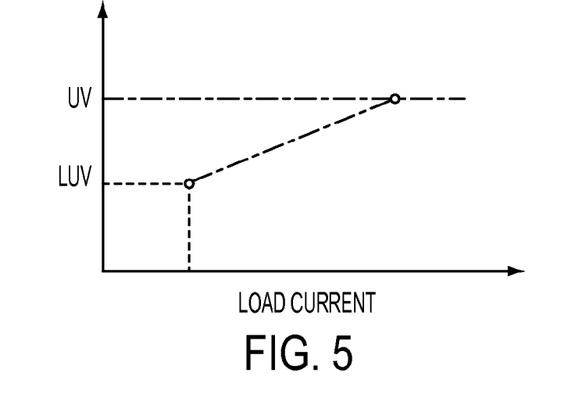
FIG. 5 is a graph showing a relationship between output current (load current) and a window for input voltage coming from an AC source from LUV to UV.

Because the unstable condition may only last for 10 cycles or less, for example, after switching to the generator mode, the input voltage protection level is returned to the nominal level (UV) thereafter for normal operation. FIG. 4 shows a range for input voltage protection level from LUV to UV on vertical axis (66% to 83%, for example), which depends on load current level between lowest under voltage (LUV) and under voltage (UV), with respect to time on horizontal axis, for the first 10 cycles. FIG. 5 shows a relationship between output current (load current) and a window for input voltage coming from an AC source from LUV to UV.

The control circuit 14, which monitors the amplitude and frequency of the input voltage at the input 11, gives the UPS the capability to check and adjust the input voltage quality, based on the output current, to a level such as the level "UV" used during the normal running mode of the UPS.

Figure 5A:
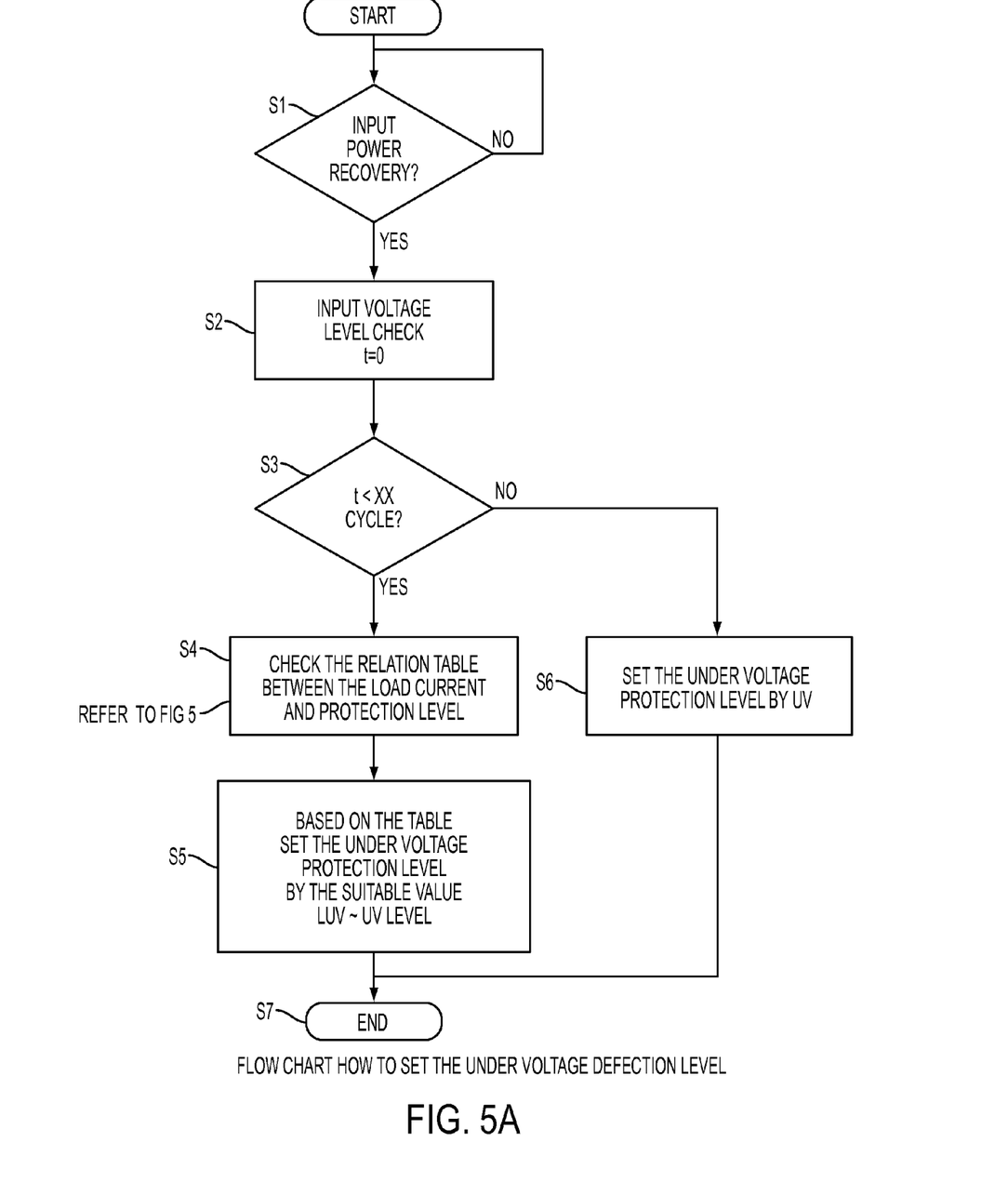
FIG. 5(A) is a flowchart for showing the procedure for setting the input voltage protection level.

FIG. 5(A) is a flowchart for showing the procedure for setting the input voltage protection level, i.e., how to set the under voltage detection level. At the start, at step S1, UPS checks to see if it is in the input power recovery state, i.e., the input power recovery from the battery power to AC power. If the UPS is not at input recovery power state, then the UPS continues to check for this state. If the UPS is in the input power recovery state, in the step S2, the input voltage level is checked at time t=0. In step S3, for time (t) less than some predetermined cycles (for example, 10 cycles), a relational table between load current and protection level is checked and based on the values in the table, a value for under voltage (UV) protection level is set to a suitable value within the range (steps S4 and S5). FIG. 5 is a graph showing a relationship between output current (load current) and a window (range) for input voltage coming from an AC source from LUV to UV. If the time (t) is greater than the time period for some predetermined cycles (S3), in step S6, the Boost-up control circuit of the UPS sets the under voltage protection level to the under voltage (UV) level as shown in FIGS. 4 and 5. Once the appropriate under voltage detection level is set at the input of the UPS as described above, the process is terminated at the step S7.

Figure 6:
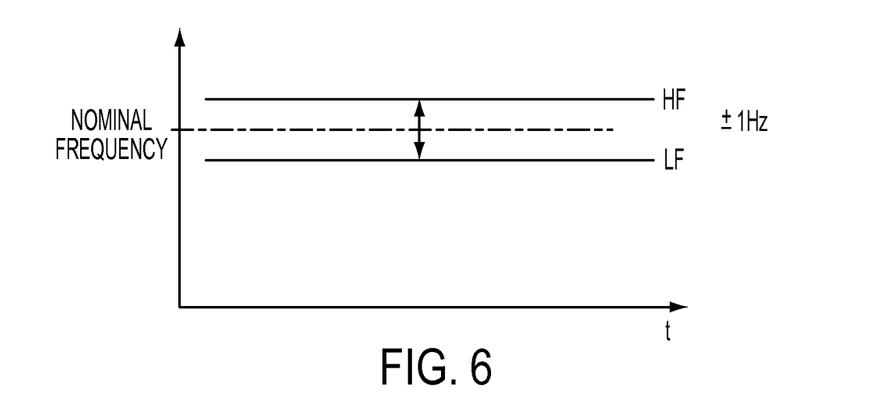
FIG. 6 is a graph showing a nominal frequency range for the UPS during a normal operation.

The case that the input frequency becomes unstable, that is, the frequency fluctuated beyond the nominal frequency range is shown in FIG. 6. For example, in case of 60 Hz application, UPS frequency fluctuation limitation is 60 Hz+/−1 Hz, i.e., 59 Hz to 61 Hz. However, if the generator output frequency is out of the range, say 62 Hz for example, the UPS controller will perceive that the input voltage is abnormal and switch back to battery backup mode.

Figure 7:
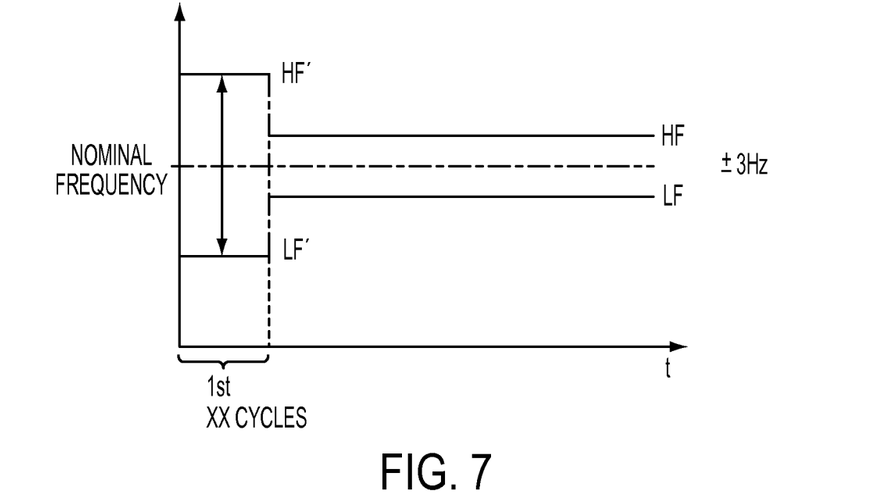
FIG. 7 is a graph showing a wide frequency range to be used for adjustment in case the frequency of the input voltage becomes unstable, for example, in the first 10 cycles followed by the nominal frequency range as shown in the graph of FIG. 6.

However, in the above exemplary embodiment of FIG. 8(A), the control circuit 14 monitors the frequency and when it detects unstable frequency, it modifies the nominal frequency range to a wide frequency range at least for the first 10 cycles as shown in FIGS. 6 and 7.

Figure 7A:
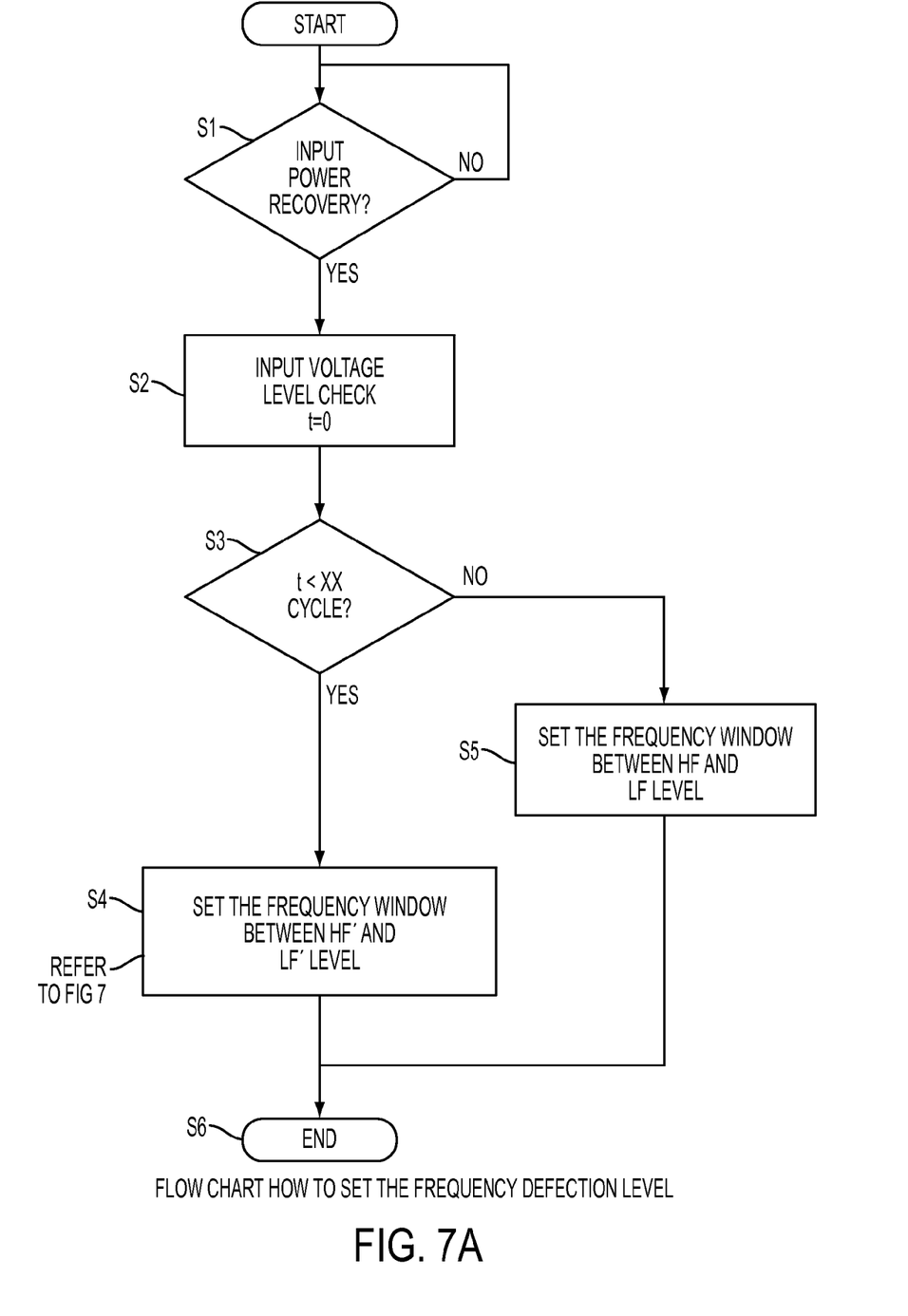
FIG. 7(A) is a flowchart for showing the procedure for setting the input frequency detection level.

FIG. 7(A) is a flowchart for showing the procedure for setting the frequency detection level, i.e., how to set the nominal frequency level. At the start, at step S1, UPS checks to see if it is in the input power recovery state, i.e., the input power recovery from the battery power to AC power. If the UPS is not at input recovery power state, then UPS continues to check for this state. If the UPS is in the input power recovery state, in the step S2, the input voltage level is checked at time t=0. In step S3, for time (t) less than some predetermined cycles (for example, 10 cycles), a predefined wide frequency window that falls between a predefined value for high frequency (HF') and low frequency (LF') is set (FIG. 7). The high and a low values are predefined values set in the table of the control circuit 14 (S4). FIG. 7 is a graph showing a wide frequency range (HF', LF'), for example ±3 Hz, to be used for adjustment in case the frequency of the input voltage becomes unstable, for example, in the first 10 cycles followed by the nominal frequency range as shown in FIG. 6. If the time (t) is greater than the time period for some predetermined cycles (S3), in step S5, the Boost-up control circuit of the UPS sets the frequency window between high frequency (HF) and low frequency (LF) within a nominal frequency range (FIG. 6). Once the frequency detection level is set at the input of the UPS as described above, the process is terminated at the step S6.

By this special adjustment made by the control circuit 14, the unstable frequency can be accepted by the UPS without the UPS switching back to the battery backup mode.

And after the frequency has stabilized, for example in 10 cycles, the detection window will return to the normal level in the range of nominal frequency. Like the amplitude of the input as noted above, the control circuit 14 monitors the frequency of the input voltage at the input 11. This gives the UPS the capability to check and adjust the frequency quality level such as 60 Hz+/−1 Hz during normal running mode.

Therefore, in the exemplary embodiment of FIG. 8(A), the control circuit 14 of the uninterruptible power supply 100 is configured to adjust the monitored values of the amplitude and/or frequency of the input voltage at the input 11 of the uninterruptible power supply 100 by detecting the output current so that it can accept the unstable voltage and/or frequency, which prevents the uninterruptible power supply 100 to switch back to the battery mode during a transfer time between the battery mode and the AC mode.

The control circuit 14 may comprise a central processing unit (CPU), a computer, a computer unit, a data processor, a microcomputer, microelectronics device, or a microprocessor to implement the above-described functionality.

Figure 9:
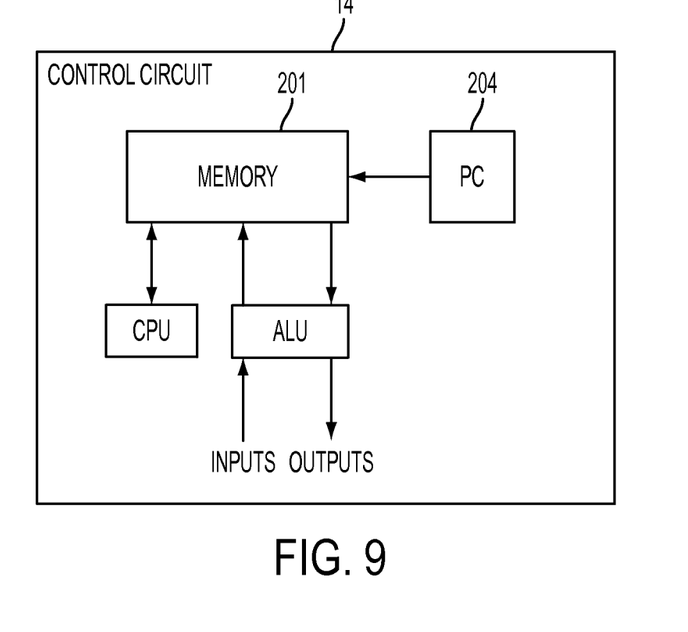
FIG. 9 is a diagram showing an internal architecture of a control circuit.

The control circuit 14 includes a memory 201, a CPU, a program counter (PC) 204 and an arithmetic logic unit (ALU) 203 as illustrated in FIG. 9. The memory includes, but is not limited to a read/write memory, read only memory (ROM), random access memory (RAM), DRAM, SRAM etc.

In other embodiments, the UPS may also be provided with a monitoring device to check the temperature at input side devices such as converter module and input filter and allow these devices to maintain the maximum temperature at the lowest voltage. Also, if the ambient temperature is lower than nominal temperature, the input current can be boosted up until the UPS reaches the maximum temperature.

While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An uninterruptable power supply (UPS) configured to switch power inputs between an alternating current (AC) mode and a battery mode, comprising:
a DC bus having a main capacitor module for storing energy to hold up a DC bus voltage across the main capacitor module;
a circuit for monitoring an amplitude and frequency of an input voltage at an input of the UPS;
a DC bus voltage detection circuit for detecting the DC bus voltage across the main capacitor module;

a load current sensing circuit for detecting a load current at an output of the UPS;

a control circuit; and a boost-up control circuit communicating with said control circuit and said DC bus, said control circuit configured to generate an adjustment value for said DC bus based on the amplitude and frequency detected at the input of the UPS by said circuit, the load current detected at the output of the UPS by said load current sensing circuit, and the DC bus voltage across the main capacitor module detected by said DC bus voltage detection circuit, wherein said boost-up control circuit configured to provide the adjustment value generated by the control circuit to the DC bus of the UPS to modify said amplitude and/or said frequency when an unstable amplitude and/or an unstable frequency are detected at the input terminal of the input voltage.

2. The uninterruptable power supply as set forth in claim 1, wherein:

said monitored value of unstable amplitude at the input terminal of the input voltage is modified by adjusting a voltage window for a predetermined number of cycles during a transfer time between the battery mode and the AC mode.

3. The uninterruptable power supply as set forth in claim 1, wherein:

said monitored value of unstable frequency at the input terminal of the input voltage is adjusted by adjusting a frequency window for a predetermined number of cycles during a transfer time between the battery mode and the AC mode.

4. The uninterruptable power supply as set forth in claim 2, wherein:

said voltage window has input voltage protection values that are greater than an operating voltage range values of the UPS, said input voltage protection values are selected by the control circuit based on an output current of the UPS.

5. The uninterruptable power supply as set forth in claim 3, wherein:

said frequency window has a range that is wider than the operating frequency range of the UPS.

6. An uninterruptable power supply method for switching power inputs between an alternating current (AC) mode and a battery mode, comprising:

storing energy to hold up a DC bus voltage across main capacitor module of a DC bus;

monitoring an amplitude and frequency of an input voltage at an input of an uninterruptable power supply (UPS) by a circuit;

detecting the DC bus voltage across the main capacitor module by a DC bus voltage detection circuit;

detecting a load current at an output of the UPS by a load current sensing circuit;

generating an adjustment value for said DC bus based on the amplitude and frequency detected at the input of the UPS by said circuit, the load current detected at the output of the UPS by said load current sensing circuit, and the DC bus voltage across the main capacitor module detected by said DC bus voltage detection circuit by using a control circuit; and providing the adjustment value generated by the control circuit to the DC bus of the UPS to modify said amplitude and/or said frequency when an unstable amplitude and/or an unstable frequency are detected at the input terminal of the input voltage by using a boost-up control circuit communicating with said control circuit and said DC bus.

7. The method as set forth in claim 6, wherein said unstable amplitude at the input terminal of the input voltage is modified by:

adjusting a voltage window for a predetermined number of cycles during a transfer time between the battery mode and the AC mode.

8. The method as set forth in claim 6, wherein said unstable frequency at the input terminal of the input voltage is adjusted by:

adjusting a frequency window for a predetermined number of cycles during a transfer time between the battery mode and the AC mode.

9. The uninterruptable power supply as set forth in claim 7, wherein:

said voltage window has input voltage protection values that are greater than an operating voltage range values of the UPS, said input voltage protection values are selected by the control circuit based on an output current of the UPS.

10. The uninterruptable power supply as set forth in claim 8, wherein:

said frequency window has a range that is wider than the operating frequency range of the UPS.

11. An uninterruptable power supply (UPS) system configured to switch power inputs between an alternating current (AC) mode and a battery mode, comprising:

a switch configured to switch between a plurality of ac power sources;

a DC bus having a main capacitor module for storing energy to hold up a DC bus voltage across the main capacitor module;

a circuit for monitoring an amplitude and frequency of an input voltage at an input of the UPS;

a DC bus voltage detection circuit for detecting the DC bus voltage across the main capacitor module;

a load current sensing circuit for detecting a load current at an output of the UPS;

a control circuit; and a boost-up control circuit communicating with said control circuit and said DC bus, said control circuit configured to generate an adjustment value for said DC bus based on the amplitude and frequency detected at the input of the UPS by said circuit, the load current detected at the output of the UPS by said load current sensing circuit, and the DC bus voltage across the main capacitor module detected by said DC bus voltage detection circuit, wherein said boost-up control circuit configured to provide the adjustment value generated by the control circuit to the DC bus of the UPS to modify said amplitude and/or said frequency when an unstable amplitude and/or an unstable frequency are detected at the input terminal of the input voltage.

12. The system as set forth in claim 11, wherein:

said unstable amplitude at the input terminal of the input voltage is modified by adjusting a voltage window for a predetermined number of cycles during a transfer time between the battery mode and the AC mode.

13. The system as set forth in claim 11, wherein:

said unstable frequency at the input terminal of the input voltage is adjusted by adjusting a frequency window for a predetermined number of cycles during a transfer time between the battery mode and the AC mode.

14. The system as set forth in claim 12, wherein:
said voltage window has input voltage protection values that are greater than an operating voltage range values of the UPS, said input voltage protection values are selected by the control circuit based on an output current of the UPS.

15. The system as set forth in claim 13, wherein:
said frequency window has a range that is wider than the operating frequency range of the UPS.

16. A non-transitory computer-readable storage medium having instructions encoded thereon for enabling a processor to execute an operation for switching power inputs between an alternating current (AC) mode and a battery mode in an uninterruptable power supply, comprising the steps of:
storing energy to hold up a DC bus voltage across main capacitor module of a DC bus;
monitoring an amplitude and frequency of an input voltage at an input of an uninterruptable power supply (UPS) by a circuit;
detecting the DC bus voltage across the main capacitor module by a DC bus voltage detection circuit;
detecting a load current at an output of the UPS by a load current sensing circuit;
generating an adjustment value for said DC bus based on the amplitude and frequency detected at the input of the UPS by said circuit, the load current detected at the output of the UPS by said load current sensing circuit, and the DC bus voltage across the main capacitor module detected by said DC bus voltage detection circuit by using a control circuit; and
providing the adjustment value generated by the control circuit to the DC bus of the UPS to modify said amplitude and/or said frequency when an unstable amplitude and/or an unstable frequency are detected at the input terminal of the input voltage by using a boost-up control circuit communicating with said control circuit and said DC bus.

17. The non-transitory computer-readable storage medium as set forth in claim 16, wherein the judgment of said unstable amplitude at the input terminal of the input voltage is set by:
adjusting a voltage window for a predetermined number of cycles during a transfer time between the battery mode and the AC mode.

18. The non-transitory computer-readable storage medium as set forth in claim 16, wherein the judgment of said unstable frequency at the input terminal of the input voltage is set by:
adjusting a frequency window for a predetermined number of cycles during a transfer time between the battery mode and the AC mode.

19. The non-transitory computer-readable storage medium as set forth in claim 17, wherein:
said voltage window has input voltage protection values that are greater than an operating voltage range values of the UPS, said input voltage protection values are selected by the control circuit based on an output current of the UPS.

20. The non-transitory computer-readable storage medium as set forth in claim 18, wherein:
said frequency window has a range that is wider than the operating frequency range of the UPS.

* * * * *